(12) United States Patent
Kamiyama

(10) Patent No.: US 6,206,432 B1
(45) Date of Patent: Mar. 27, 2001

(54) BALL-LOCK-TYPE QUICK-ACTING CONNECTOR

(75) Inventor: Kunihiro Kamiyama, Fujisawa (JP)

(73) Assignee: NOK Corporation, Tokyo (JP)

( * ) Notice: Subject to any disclaimer, the term of this patent is extended or adjusted under 35 U.S.C. 154(b) by 0 days.

(21) Appl. No.: 09/236,641

(22) Filed: Jan. 26, 1999

(30) Foreign Application Priority Data

| Jan. 26, 1998 | (JP) | 10-026347 |
| Jan. 30, 1998 | (JP) | 10-032322 |
| Sep. 22, 1998 | (JP) | 10-267643 |
| Sep. 22, 1998 | (JP) | 10-267644 |
| Sep. 22, 1998 | (JP) | 10-267645 |

(51) Int. Cl.[7] .................................................. F16L 35/00
(52) U.S. Cl. ........................... 285/81; 285/315; 285/348; 285/382; 285/424; 285/906
(58) Field of Search ..................... 285/81, 82, 315, 285/316, 374, 424, 348, 906, 382

(56) References Cited

U.S. PATENT DOCUMENTS

| 3,352,576 | * | 11/1967 | Thomsen | 285/316 |
| 4,006,922 | * | 2/1977 | Bartholomew | 285/315 |
| 4,429,902 | * | 2/1984 | Cowan | 285/315 |
| 4,844,515 | * | 7/1989 | Field | 285/316 |
| 5,239,944 | * | 8/1993 | Hostetler | 285/379 |
| 5,938,244 | * | 8/1999 | Meyer | 285/379 |

FOREIGN PATENT DOCUMENTS

| 2477088 | * | 4/1975 | (DE) | 285/316 |
| 2636715 | * | 3/1990 | (FR) | 285/316 |
| 484768 | * | 5/1938 | (GB) | 285/315 |

* cited by examiner

Primary Examiner—Dave W. Arola
(74) Attorney, Agent, or Firm—Jacobson, Price, Holman & Stern PLLC

(57) ABSTRACT

A quick connector of the ball-lock type includes a socket member, a plug member and a slidable sleeve which are specifically designed to permit manufacture by deep drawing of a sheet metal. The socket member and the plug member are each shaped in the form of a stepped tube and the plug member is inserted into the socket member in a telescoping fashion to form an annular chamber therebetween. An O-ring and a backup ring are mounted within the annular chamber by inserting them into the bore of the socket member.

24 Claims, 12 Drawing Sheets

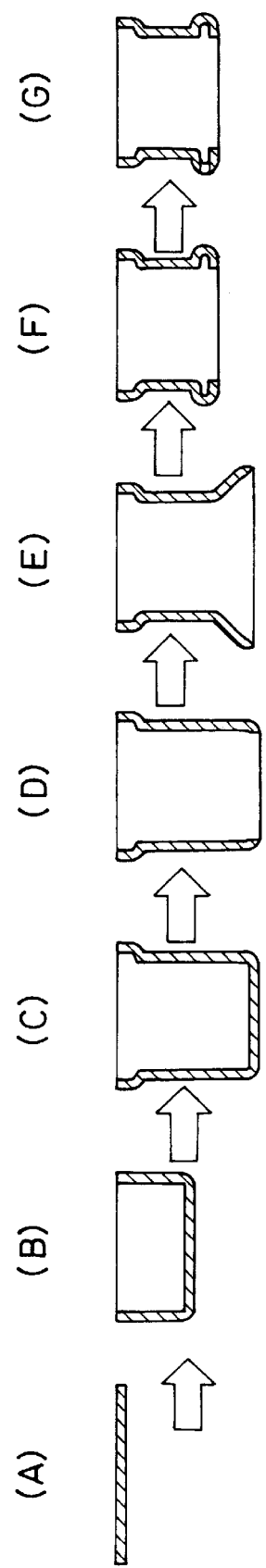
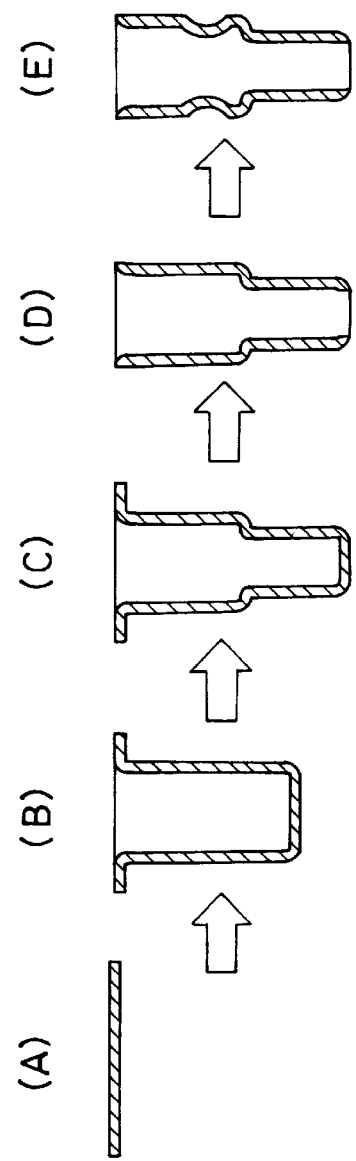
FIG. 9
FIG. 10

FIG. 20
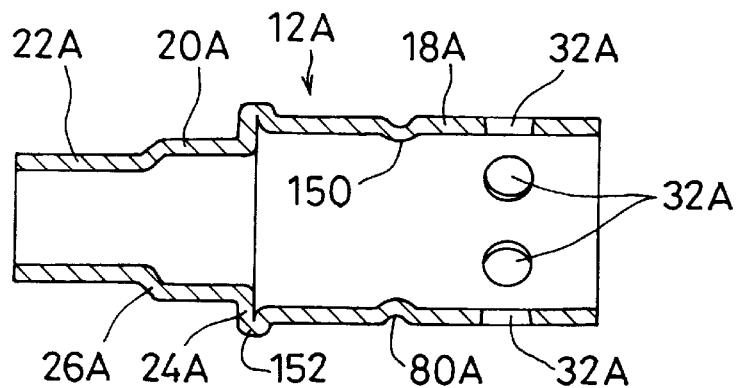
FIG. 21
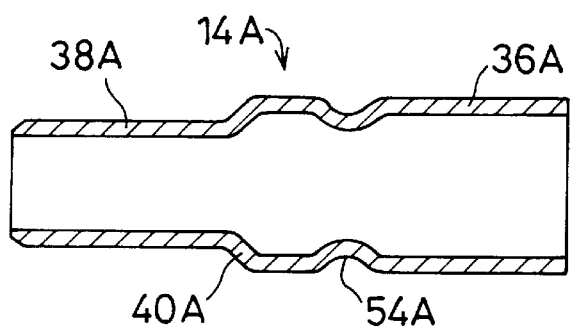
FIG. 22
FIG. 23
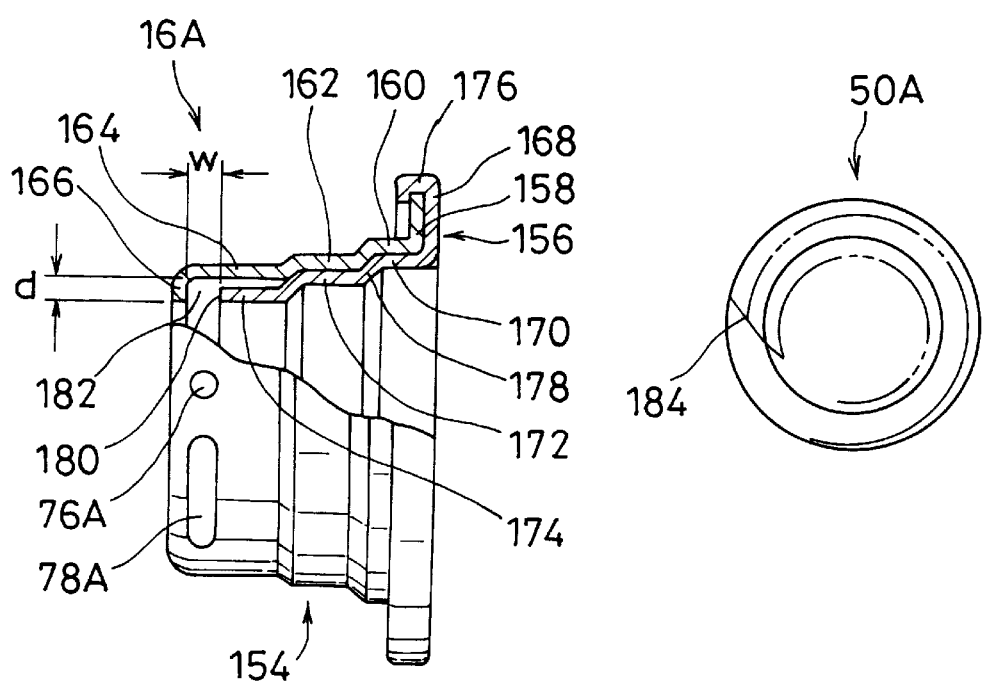

BALL-LOCK-TYPE QUICK-ACTING CONNECTOR

BACKGROUND OF THE INVENTION

1. Field of the Invention

The present invention relates to improvements in ball-lock-type quick-acting connectors which may be used in a variety of applications including automotive fuel injection systems, hydraulic systems and pneumatic systems to detachably connect fluid lines or pipes by a single action.

2. Description of the Prior Art

Ball-lock-type quick-acting connectors or pipe couplings are well-known and have been used in various fields of industries.

As shown in FIGS. 1 and 2 of the accompanying drawings, the conventional ball-lock type connector typically includes a socket member 1 and a plug member 2 which are adapted to be detachably coupled with each other in a telescoping fashion, the members being suitably attached by threaded couplings and the like to the ends of respective fluid lines to be connected.

The socket 1 is provided with a plurality of tapered through-holes or pockets 3 that are circumferentially equally spaced apart from one another. Each pocket 3 receives a locking ball 4 made of steel which is adapted to partly protrude radially inwardly of the pocket to thereby engage within an annular groove 5 formed on the outer circumference of the plug 2. The connector further includes a spring-biased control sleeve or slider 6 which is slidably fitted over the socket 1 to control the radial position of the locking balls.

To connect the socket and plug members, the control sleeve 6 is first retracted against the spring bias as shown in FIG. 2 and the plug is then inserted into the socket until the groove 5 is brought into registration with the pockets 3. Then the sleeve is returned to the locking position shown in FIG. 1 whereby the locking balls 4 are cammed into the groove 5 to retain the socket and plug together. An O-ring 7 mounted within an annular seal ring groove 8 formed on the inner periphery of the socket establishes a fluid-tight seal between the socket and plug members. The return coil spring serves to keep the control sleeve in its locking position.

To disconnect the socket and plug, the control sleeve is moved to the unlocking position shown in FIG. 2 to release the locking balls. As the plug is then pulled away from the socket, the locking balls 4 are cammed out of the annular groove 5 as shown in FIG. 2 to thereby permit the plug member to be pulled out of the socket member.

In applications wherein the connector is subjected to a high fluid pressure, a backup ring 9 is normally used and is arranged within the seal ring groove 8 at the downstream side of the O-ring 7 to back-up the O-ring.

The problem associated with the conventional quick-acting connectors is that they are costly to manufacture because the major parts thereof, such as the socket, plug and control sleeve, must be made by using machine tools such as lathe, drilling and milling machines.

Moreover, the presence of the seal ring groove on the inner surface that defines the bore of the socket member involves a number of problems. First, machining of the seal ring groove is difficult to perform at a high precision because during machining a cutting tool must be inserted and positioned inside the narrow bore of the socket.

More importantly, the O-ring tends to be twisted and distorted as it is inserted into the socket since the outer diameter of the O-ring is generally larger than the inner diameter of the socket bore and, therefore, the O-ring must be radially compressed or deformed to a substantial degree prior to and during insertion into the bore of the socket. If the O-ring as finally installed within the seal ring groove is in a twisted or distorted state, there is a risk of fluid leakage. In addition, the plug member would bite into the O-ring to thereby damage the O-ring each time the plug is inserted into the socket.

When the O-ring once fitted in the seal ring groove is to be dismounted therefrom for inspection or for any other reasons, a sharp tool such as a hook must be used to scoop the O-ring out of the groove. This tends to damage the O-rings and prevents their re-use.

Furthermore, the overall wall thickness of the socket member must be selected to be large enough to provide a sufficient mechanical strength even after the material which forms the socket wall is partly removed by cutting or milling to form the seal ring groove. This prevents reduction in weight of the connectors and results in an increase in the production costs.

BRIEF SUMMARY OF THE INVENTION

Accordingly, an object of the present invention is to provide an improved ball-lock-type quick-acting connector which can be manufactured in a cost effective manner.

Another object of the invention is to provide an improved ball-lock-type quick-acting connector having such a design and configuration that permits manufacture of the major parts thereof from sheet metals.

A still another object of the invention is to provide an improved ball-lock-type quick-acting connector having a design and configuration particularly suitable to manufacture the major parts thereof by plastic working, such as deep drawing or roll forming, of sheet metals.

A further object of the invention is to provide a ball-lock-type quick-acting connector which is specifically designed to permit easy installation and removal of a sealing ring.

Another object of the invention is to provide a ball-lock-type quick-acting connector wherein a sealing ring is retained in position without recourse to the provision for the conventional seal ring groove.

Another object of the invention is to provide a ball-lock-type quick-acting connector which is light in weight.

This invention provides a ball-lock-type quick-acting connector having a socket member and a plug member detachably coupled with each other in a telescoping fashion.

According to the invention, the socket and plug members are designed and configured suitable to be manufactured by plastic working, such as deep drawing or roll forming, of a sheet metal. More specifically, the socket is provided with a stepped bore having two bore sections of different inner diameter connected by a shoulder portion. The plug member presents a stepped cylindrical outer surface including two surface sections of different outer diameter connected by a shoulder portion.

When the plug member is inserted in the socket member, an annular chamber will be formed between the socket and plug members, the chamber being defined in the axial direction between the shoulder portions of the socket and plug members. This annular chamber is used to install a sealing ring and a backup ring which will be confined axially between the shoulders of the socket and plug members.

With this arrangement, the socket and plug members may be made mostly by plastic working of a sheet metal without requiring machining by machine tools, because the conventional seal ring groove need not be formed on the bore of the socket member. Installation and removal of the sealing ring are facilitated because no ring groove is present.

In a preferred embodiment, the socket member is provided with an inwardly directed annular projection projecting radially inwardly from the large-diameter bore section. The annular projection serves to prevent the backup ring from slipping out of the first bore when the plug member is disconnected from the socket member.

Preferably, the control sleeve of the connector is also made by plastic working of a sheet metal and comprises inner and outer tubes which are press fitted and crimped with each other to form a unitary sleeve structure.

In a preferred embodiment, the connector further includes a stop ring for positively retaining the control sleeve against the socket member in the locking position of the sleeve. The provision of a stop ring to positively retain the control sleeve in its locking position is desirable in applications wherein the connector is subjected to substantial vibrations.

These features of the invention as well as other features and advantages thereof will become apparent from the following description.

BRIEF DESCRIPTION OF THE DRAWINGS

FIGS. 8–10 are schematic views showing various sequences of metal working carried out to produce the socket member, the control sleeve and the plug member, respectively, of the connector shown in FIGS. 3–6;

FIGS. 20 and 21 are cross-sectional views showing the socket and plug members, respectively, of the connector according to the second embodiment of the invention;

FIG. 22 is a side view, partly cut away, of the control sleeve of the connector according to the second embodiment of the invention;

FIG. 23 is a side view of the backup ring used in the second embodiment;

DESCRIPTION OF THE PREFERRED EMBODIMENT

Figure 1:
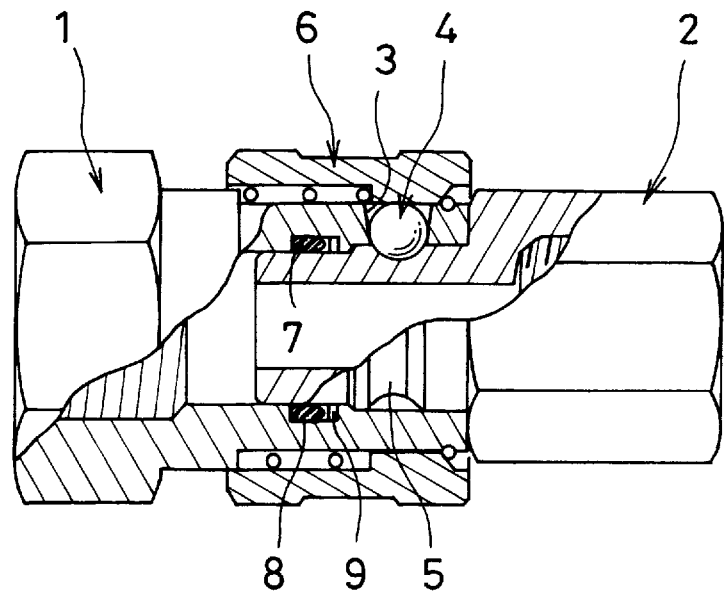
FIGS. 1 and 2 are side views, partly cut away, of the conventional quick connector in its coupled and disconnected positions, respectively.

Referring to FIGS. 3–7, there is shown a quick connector according to the first embodiment of the invention. The connector 10 includes a socket member 12, a plug member 14 and a control sleeve or slider 16, all of which are made primarily by deep drawing of sheet metal blanks in a manner described later.

The socket member 12 is comprised of three sections 18, 20, 22 of different inner diameter to thereby form a stepped bore through the socket, with the first and second sections 18 and 20 being connected by a first shoulder portion 24 and the second and third sections 20 and 22 being connected by a second shoulder portions 26. The bore 28 of the first section 18 is made larger in diameter than the bore 30 of the second section 20.

The first section 18 of the socket 12 is provided with a plurality of tapered pockets or through-holes 32 which are circumferentially spaced apart at an equal angle from one another, there being six such pockets in the illustrated embodiment.

A locking ball 34 made of steel is received in each of the pockets 32. As will be apparent, for example, from FIG. 4, each pocket 32 is tapered in such a manner that the diameter at the radially outer part of the pocket is larger than the diameter at the radially inner part. The diameter of the locking balls 34 is selected to be larger than the radial wall-thickness of the socket member 12, the ball diameter being smaller than the diameter at the radially outer part of the pockets 32 but larger than the diameter at the radially inner part of the pockets. Accordingly, the balls 34 will not be allowed to pass radially inwardly through the pockets 32 but are permitted to project only partly in the inward direction.

Figure 5:
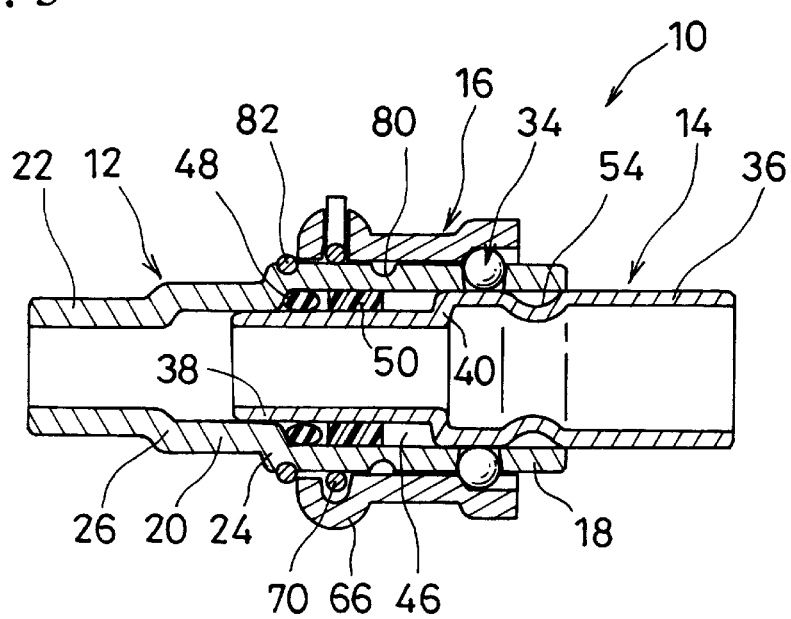
Figure 6:
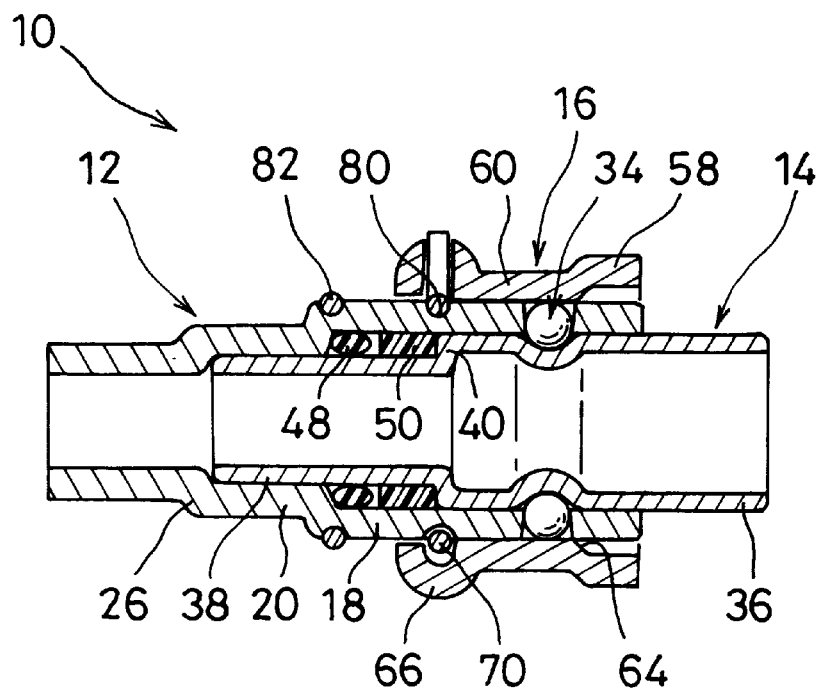

The plug member 14 is comprised of a first section 36 and a second section 38 connected by an inclined shoulder portion 40 and presents a stepped cylindrical outer surface. The outer surface 42 of the first section 36 has such an outer diameter as to be closely fitted in the bore 28 of the socket member. Likewise, the outer surface 44 of the second section 38 has such an outer diameter as to be closely fitted in the bore 30 of the socket member. Accordingly, the plug member 14 may be slidingly inserted into the socket member 12 in a telescoping fashion as shown in FIGS. 5 and 6.

When the plug member 14 is inserted into the socket member 12, an annular chamber 46 is formed which is defined in the axial direction between the socket shoulder 24 and the plug shoulder 40 and in the radial direction between the socket bore 28 and the plug outer surface 44.

Figure 7:
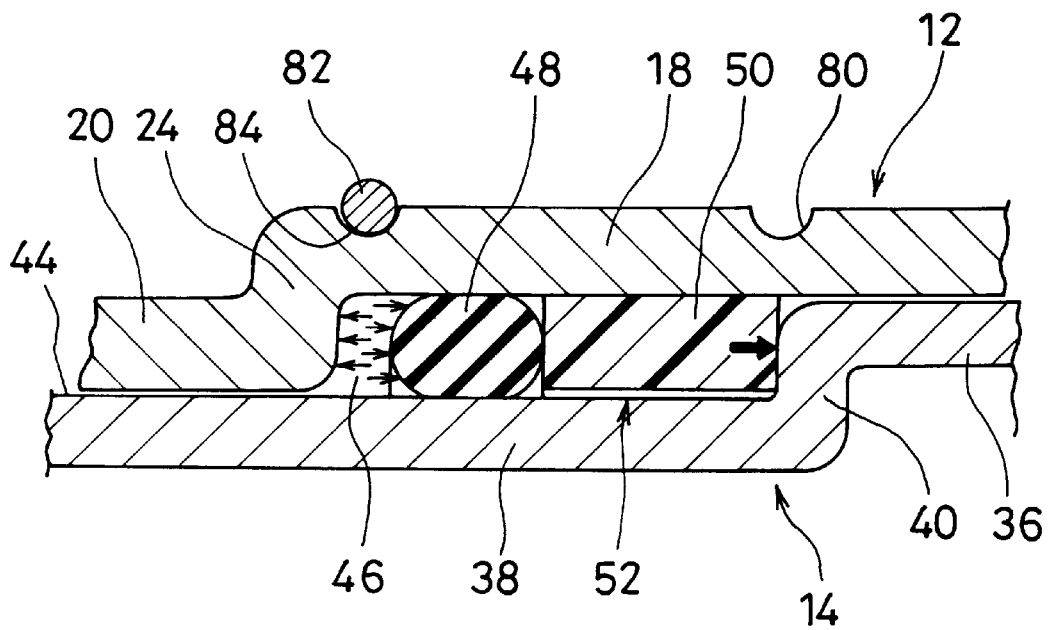
FIG. 7 is an enlarged cross-sectional view showing a part of the connector shown in FIG. 6.

An O-ring 48 made of an elastomeric material is loosely or interference fitted in the bore 28 of the socket member 12. The O-ring 48 has such a cross-sectional diameter as to be sufficiently compressed as best shown in FIG. 7 to establish a fluid tight seal between the members 12 and 14 when the plug 14 is inserted into the socket 12.

A backup ring 50 made of plastics is interference fitted in the socket bore 28 at the downstream side of the O-ring 48. The backup ring 50 is so sized that a small radial clearance 52 is left between the inner periphery thereof and the outer surface 44 of the second section 38 of the plug as shown in FIG. 7.

The first section 36 of the plug 14 is provided with an annular groove 54 which is adapted to be engaged by the locking balls 34. The groove 54 has an arcuate cross-section having an inner diameter roughly equal to the diameter of the locking balls 34. The side surfaces of the groove 54 are slanted and are smoothly merged into the cylindrical outer surface 42 of the plug 14 to ensure that the balls 34 smoothly roll into and out of the groove 54.

The axial position of the groove 54 is selected such that the groove 54 is brought into registration with the pockets 32 when the plug member 14 is inserted into the socket member 12 until the frontal end 56 of the plug member 14 abuts against the shoulder 26 of the socket member 12 as shown in FIG. 6. When the plug 14 is properly inserted into the socket 12 to bring the groove 54 into registration with the pockets 32, the locking balls 34 will be allowed to partly protrude radially inwardly to engage into the groove 54.

The radial movement of the balls 34 are controlled by the control sleeve 16 which is slidably fitted over the socket 14. The sleeve 16 has an axial length smaller than the length of the first section 18 of the socket 12. The control sleeve 16 has a large diameter section 58, a small diameter section 60 slidably fitted around the socket first section 18, and a tapered shoulder portion 62 located between the sections 58 and 60.

The inner surface of the shoulder portion 62 forms a slanted cam surface 64 intended to drive the locking balls 34 fully into the pockets 32.

Figure 4:
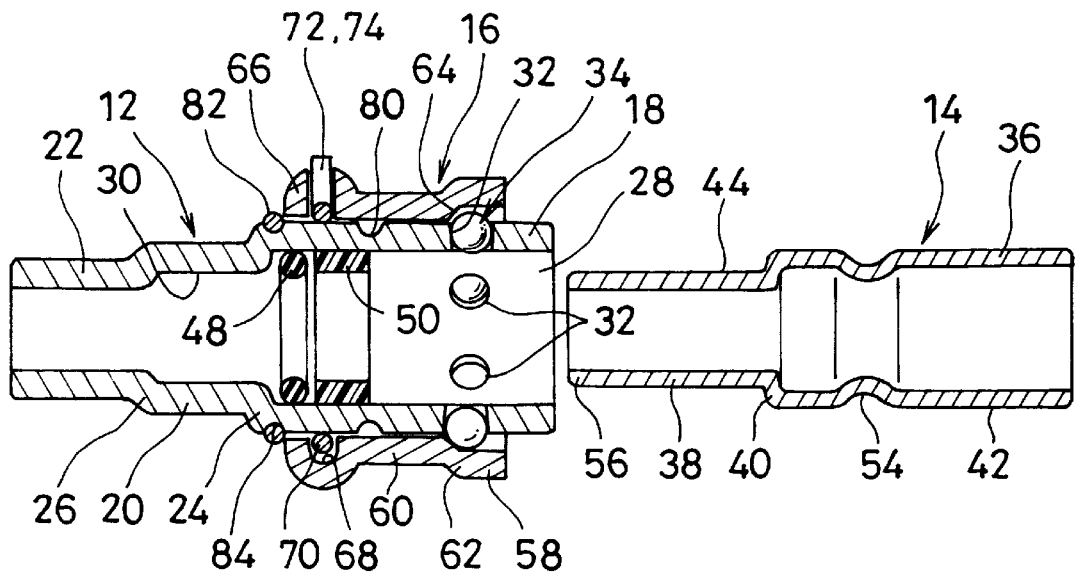
FIGS. 4–6 are cross-sectional views showing different stages of connection and disconnection of the quick connector shown in FIG. 3.

The first section 58 of the sleeve 16 has such an inner diameter that, when the sleeve 16 is held in its inoperative or unlocking position shown in FIGS. 4 and 5, an annular escapement space for the locking balls 34 is formed between the sleeve section 58 and the socket section 18 to permit the locking balls 34 to move radially outwardly until the balls 34 are disengaged out of the retaining groove 54.

Figure 3:
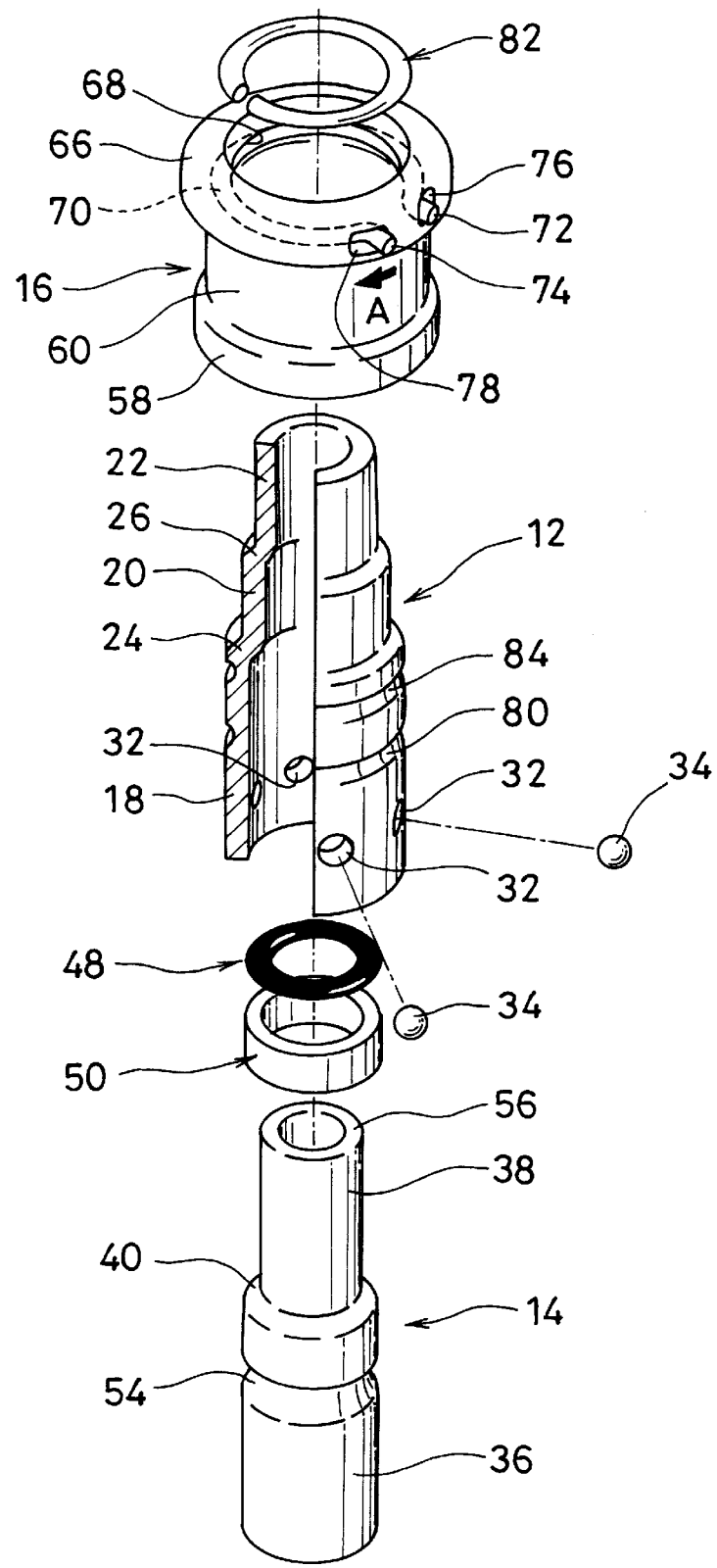
FIG. 3 is an exploded view of the quick connector according to the first embodiment of the invention.

The end 66 of the sleeve 16 opposite to the escapement section 58 is curled to form an annular inner groove 68 in which a resilient stopper ring 70 made of spring steel is loosely received. As best shown in FIG. 3, the stopper ring 70 is generally C-shaped and has a pair of radially outwardly projecting ends 72 and 74. One end 72 of the stopper ring 70 is closely received in a circular aperture 76 formed across the curled end 66. Other end 74 of the stopper ring 70 is movably fitted within a circumferentially extending elongated opening 78 similarly formed across the wall of the curled end 66.

The stopper ring 70 is preloaded in such a manner that the ends 72 and 74 thereof as retained in respective openings 76 and 78 are biased toward one another. Therefore, the stopper ring 70 tends to be resiliently brought into engagement with the outer surface of the first section 18 of the socket 12. It is therefore possible to slide the control sleeve 16 axially along the socket member 12 while the stopper ring 70 is held in frictional engagement with the outer surface of the socket 12.

The stopper ring 70 is designed to be brought into engagement with an annular groove 80 formed on the outer surface of the socket 12. The groove 80 is axially positioned such that the stopper ring 70 is brought into registration with the groove 80 when the sleeve 16 is shifted into the operative or locking position shown in FIG. 6. As soon as the stopper ring 70 comes into registration with the groove 80 in response to the sliding movement of the sleeve 16 along the socket 12, the stopper ring 70 will automatically snap fit into the groove 80, whereupon the control sleeve 16 is axially locked by the stopper ring 70 with respect to the socket 12. In this position, the locking balls 34 are confined by the small diameter section 60 of the sleeve 16 within the respective pockets 32 to thereby engage within the ball retaining groove 54 as shown in FIG. 6.

The control sleeve 16 as retained by the stopper ring 70 with respect to the socket member 12 may be released by pulling by a finger the end 74 of the stopper ring 70 away from the other end 72 as shown by the arrow A in FIG. 3, whereby the stopper ring 70 will be expanded and disengaged from the groove 80 of the socket 12.

To limit the backward travel of the control sleeve 16, a stop ring 82 in the form of a circlip or snap ring is mounted within an annular groove 84 formed on the outer circumference of the socket member 12.

Referring to FIGS. 8–16, the method of making of the three major parts of the connector 10 will be described. The socket members 12, the plug members 14 and the control sleeves 16 may be manufactured on a mass production basis in a cost effective manner by using a transfer press wherein sheet metal blanks are subjected to deep drawing and curling in addition to other processing such as punching and trimming.

Figure 8:
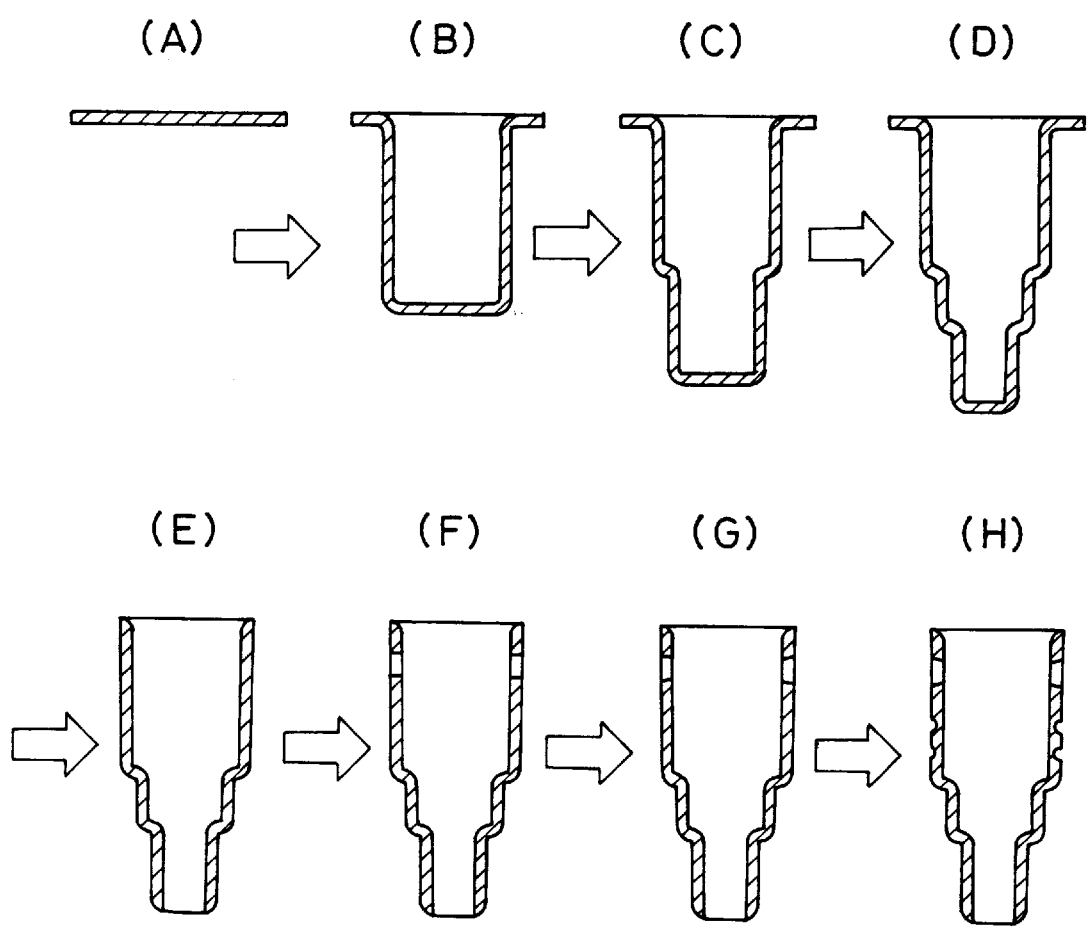
Figure 11:
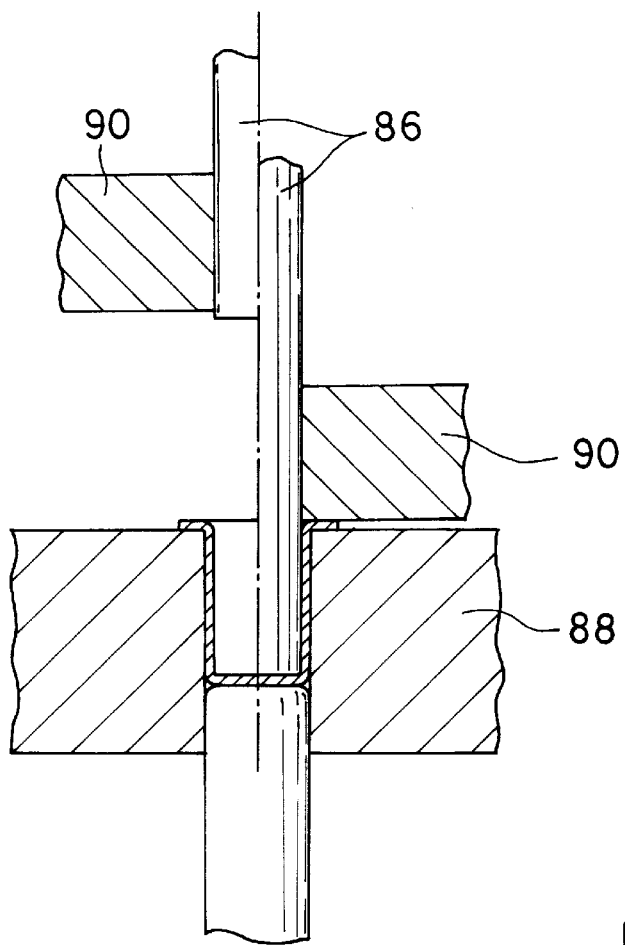
FIGS. 11–16 are cross-sectional views showing the movable and stationary parts in different stations of a transfer press used to perform several of the sequences shown in FIGS. 8–10, with the left-hand and right-hand parts of the drawings with respect to the center line showing the inoperative and operative positions, respectively, of the parts of the transfer press.

Referring to FIG. 8, there are shown various operational sequences (A) through (H) required to work a sheet metal blank into the socket member 12. A circular sheet metal blank is prepared in the sequence (A) by punching of a sheet metal strip at the first stage of the transfer press. Then at step (B) the blank is subjected to a first step of deep drawing whereby the blank is deformed into an elongated hat-shaped configuration as shown. Deep drawing may be carried out in the same transfer press by using a press shown in FIG. 11 having a deep drawing punch 86 cooperating with a forming die 88, the flange of the blank being securely sandwiched between the die 88 and a pressor member 90 during drawing. The semi-product is subjected to further steps of deep drawing (C) and (D) in the similar manner to form two shoulder portions 24 and 26 as shown.

Figure 12:
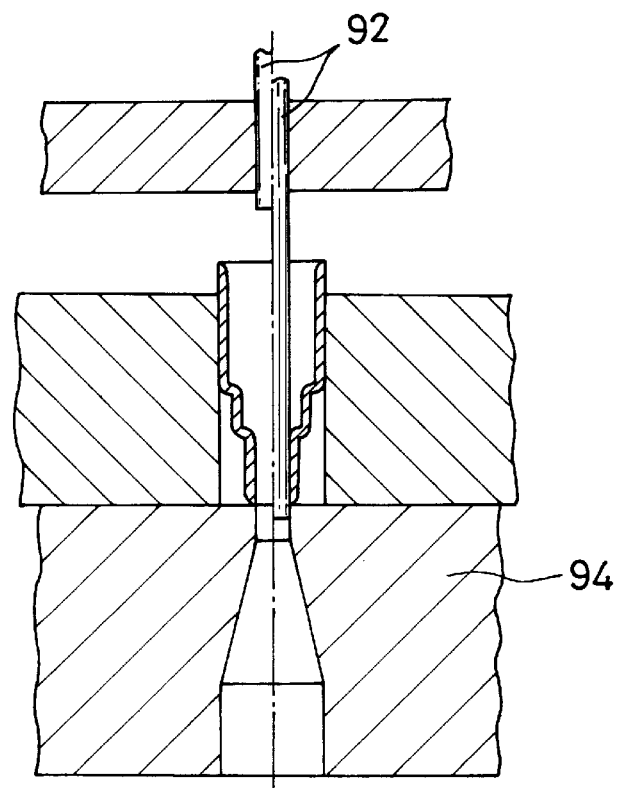
Figure 13:
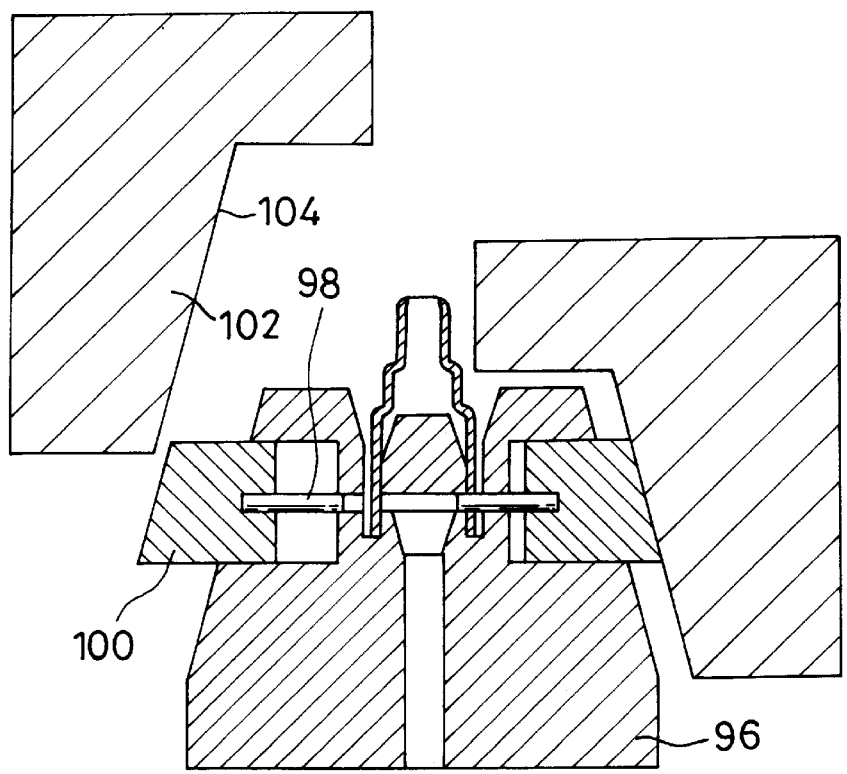
Figure 14:
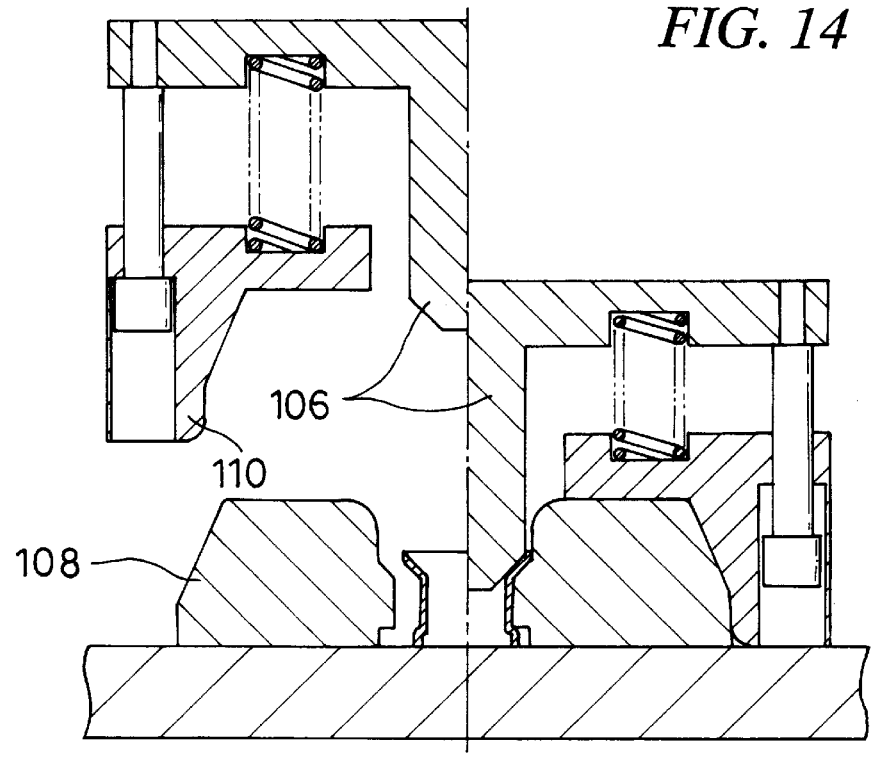

Then the flange of the semi-product is removed by trimming in a manner not shown. Thereafter, the bottom of the semi-product is punched as shown in FIG. 12 by a punch 92 that cooperates with a trimming die 94. The resulting semi-product is shown at (E) of FIG. 8.

Then at sequence (F) the product is subjected to punching to form through-holes serving as the pockets 32. This may be done by a press shown in FIG. 13 equipped with a stationary die 96 and a plurality of radially extending punches 98 mounted on slidable blocks 100 which are adapted to be driven radially inwardly by a movable member 102 provided with a conical cam surface 104.

The through-holes thus formed are then finished by tapering at step (G) to form the conical pockets 32. Finally, at sequence (H) the annular groove 84 for the circlip 82 and the annular groove 80 for the stopper ring 70 are formed to obtain the socket member 12. Formation of the grooves 80 and 84 may be carried out at a machining station other than the transfer press by using a machine tool such as a lathe.

The control sleeve 16 also may be made from a sheet metal according to sequences (A) through (G) shown in FIG. 9. Referring to FIG. 9, a circular blank is similarly prepared by punching (step A) and is subjected to deep drawing (steps B and C). At sequence (D) the bottom wall of the product is removed by punching in a similar manner.

Figure 15:
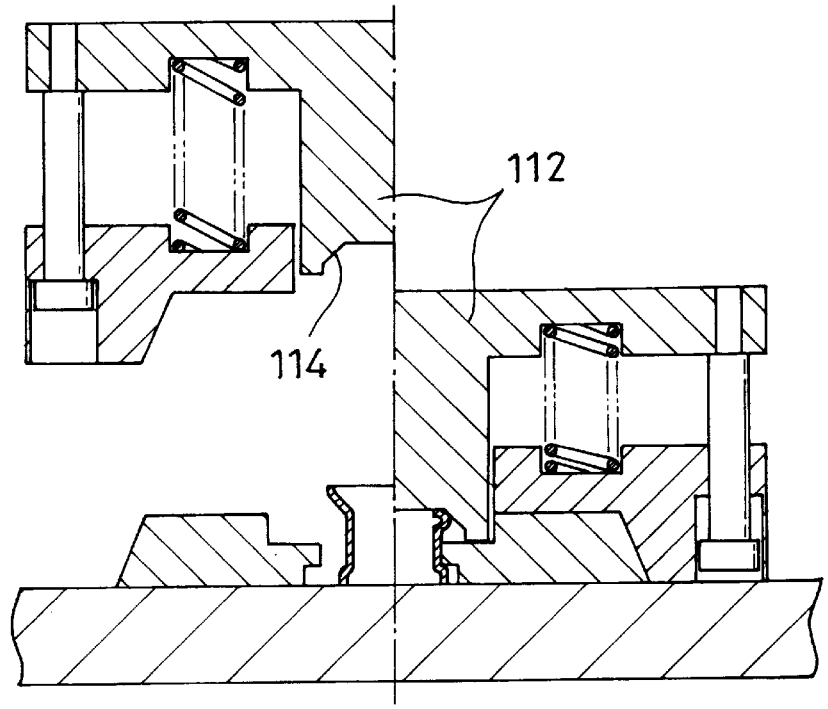

In preparation for a curling operation to be carried out subsequently at step (F), the semi-product is subjected at step (E) to stamping by which an end of the semi-product is flared out as shown. Flaring may be performed by a press shown in FIG. 14 and equipped with a forming punch 106 and a slidable split die 108 driven by a cam member 110. Thereafter, the flared end of the product is subjected at sequence (F) to curling which is carried out by a press as shown in FIG. 15, the press being equipped with a movable member 112 having a tapered curling surface 114 adapted to curl the flared end inwardly. Finally, the product is subjected to punching at step (G) to form the openings 76 and 78.

Figure 16:
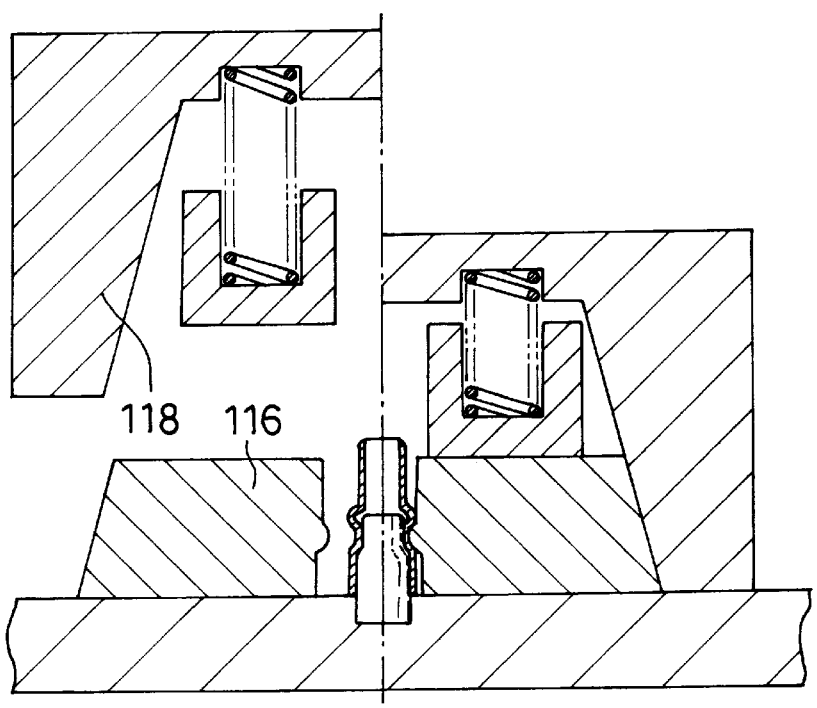

The plug member 14 may be prepared in the similar manner as shown in FIG. 10 by punching (step A), deep drawing (steps B and C), end wall punching (step D) and stamping (step E) stamping at step E is intended to form the annular groove 54 for the locking balls 34 and is carried out by using a press having a slidable split former 116 driven by a cam member 118 as shown in FIG. 16.

In this manner, the major parts of the connector, including the socket member 12, the plug member 14 and the control sleeve 16, are all made from a sheet metal by using a transfer press, without requiring substantial amount of machining by machine tools such as lathe, drilling and milling machines. Accordingly, the major parts of the connector may be manufactured at an extremely low cost. Furthermore, the use of a sheet metal is advantageous in reducing the wall-thickness of the connector to thereby provide a connector which is light in weight.

When the major parts of the connector are prepared in the foregoing manner, the O-ring 48 is mounted within the bore 28 of the socket 12. Generally, the O-ring 48 may be snugly fitted within the bore 28 in a free state. Where necessary, however, the O-ring 48 may be interference fitted within the bore 28 in a slightly compressed state. In either case, installation of the O-ing 48 is easy to perform because there is no need to forcibly compress the O-ring 48 to any excessive degree. The O-ring 48 can be mounted smoothly without causing any distortion or twisting. The backup ring 50 is then inserted by interference fit within the bore 28 at the outer side of the O-ring 48. The backup ring 50 may be pushed into the bore 28 until the O-ring 48 abuts against the shoulder 24.

In use, the outer ends of the socket and plug members 12 and 14 may be suitably connected by welding or threaded couplings to fluid lines, not shown, to be connected.

To connect the socket 12 and plug 14 together, the free end 74 of the stopper ring 70 is first pulled by a finger in the direction shown by the arrow A in FIG. 3 to disengage the stopper ring 70 out of the groove 80 of the socket 12 and the operator then moves the sleeve 16 to the left as viewed in FIG. 4 until it abuts against the circlip 82. As the stopper ring 70 frictionally engages the outer surface of the socket 12, the sleeve 16 will be retained in position even though the operator frees his finger from the sleeve 16. Accordingly, it is possible for the operator to use both hands in connecting the socket and plug members. This facilitates the connecting operation and provides an advantage over the quick connectors of the conventional design wherein the operator must continue to grip the sleeve against the action of the return spring throughout the connecting operation.

The operator may then insert the plug 14 into the socket 12 as shown in FIG. 5. The O-ring 48 will be compressed to establish a fluid tight seal between the socket and plug members as the small diameter section 38 of the plug is advanced past the O-ring.

As the plug member 14 is inserted, the locking balls 34 are moved radially outwardly by the inclined shoulder portion 40 and give way to the large diameter section 36 of the plug 14.

After the plug 14 is fully inserted into the socket 12 until the frontal end 56 of the plug member 14 abuts against the shoulder 26 of the socket member 12, the sleeve 16 is pushed to the right as viewed in FIG. 6. As the tapered cam surface 64 of the control sleeve is brought into contact with the balls 34, the balls are cammed partly into the retaining groove 54 of the plug whereby the socket and plug members 12 and 14 are locked together.

As the sleeve 16 is advanced further until the stopper ring 70 of the sleeve is brought into registration with the groove 80 of the socket member 12, the stopper ring 70 will automatically snap fit into the groove 80, whereby the sleeve 16 is positively locked with respect to the socket 12.

Figure 2:
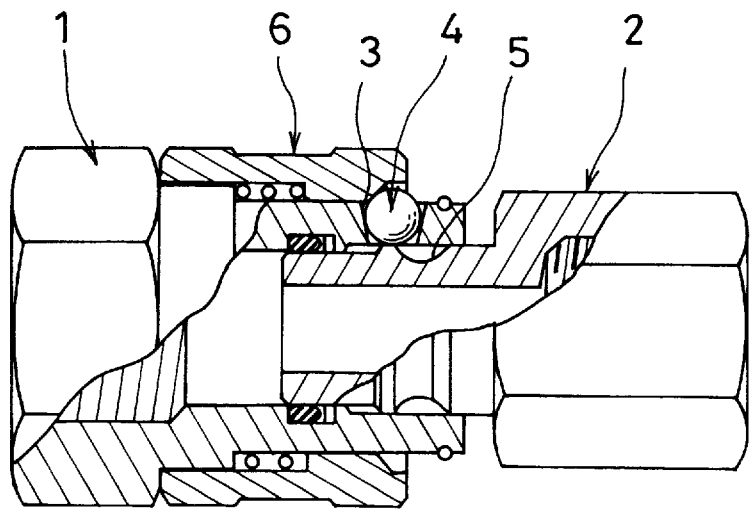

As compared with the quick connectors of the conventional design wherein the control sleeve is retained in its locking position by a return spring as illustrated, for example, in FIGS. 1 and 2, the positive locking of the control sleeve 16 accomplished by the stopper ring 70 is particularly advantageous in situations wherein the connector is subjected to a high magnitude of vibrations. For instance, in the case that the conventional ball-lock type quick connectors provided with the return springs are used to connect fuel lines in automotive fuel injection systems, there is a risk that the socket and plug members are inadvertently disconnected because of the control sleeve being shifted to its unlocking position when the frequency of vibration resulting from the engine operation coincides with the resonance frequency of the sleeve as biased by the return spring thereby causing the control sleeve to vibrate excessively. In the connector according to the invention, such inadvertent disconnection is avoided because the conventional return spring is eliminated and the sleeve is positively retained in its locking position by the stopper ring 70.

As a fluid under pressure is allowed to flow through the fluid lines connected by the connector 10, the fluid pressure will be applied to the O-ring 48 as shown in FIG. 7, causing the backup ring 50 to abut against the shoulder 40 of the plug member 14. The fluid pressure will tend to separate the socket and plug members from one another but any axial force tending to disconnect the connector will be resisted by the locking balls 34 engaged within the retaining groove 54. The locking balls 34 will be confined within the respective pockets 32 and will continue to be engaged within the groove 54 as long as the stopper ring 70 keeps the sleeve 16 in its locking position. The control sleeve 16 cannot be shifted to the unlocking position unless the stopper ring 70 is intentionally and positively expanded by pulling the end 74 of the stopper ring 70.

To disconnect the socket 12 and plug 14 from each other, the stopper ring 70 is disengaged from the groove 80 and the sleeve 16 brought in the inoperative position in a manner described before. As the sleeve 16 is retained in the inoperative position by the stopper ring 70 that frictionally engages the socket 12, the socket and plug members may be pulled apart in an easy manner.

As the backup ring 50 is radially spaced from the outer surface 44 of the plug 14 by the presence of the small clearance 52, the backup ring 50 will not be subjected to any axial frictional or dragging force when the plug member 14 is pulled away from the socket member 12 to disconnect the connector. Any axial frictional force which may be applied to the O-ring 48 in the direction of pull will be resisted by the backup ring 50 which is interference fitted within the socket bore 28. As a result, the backup ring 50 will prevent the O-ring 48 from being slipped out of the socket 12 as the plug 14 is pulled away from the socket 12.

Figure 17:
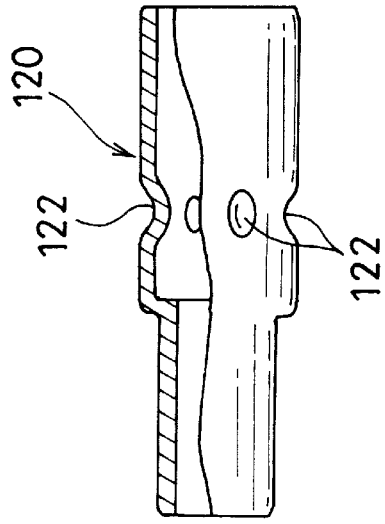
FIGS. 17 and 18 are perspective and cross-sectional views, respectively, of the modified form of the plug member.
Figure 18:
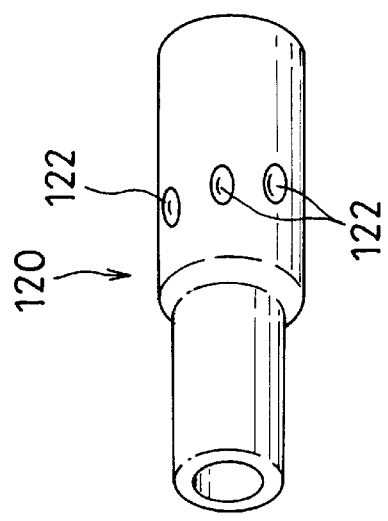

Referring to FIGS. 17 and 18, there is shown a modified form of the plug member which may be used in combination with the socket member 12 in lieu of the plug member 14 shown in FIGS. 3–6. As shown in FIGS. 17 and 18, the plug member 120 as modified is provided at the outer circumference thereof with a plurality of discrete hemispherical recesses 122 circumferentially spaced apart at an equal angle from each other. The recesses 122 are intended to be engaged by the locking balls 34 and are therefore equal in number to the locking balls 34. Apart from the provision for the discrete recesses 122 instead of the annular groove 54, the plug member 120 is designed similar to the plug member 14 and is made from a sheet metal in the similar manner.

The mode of use of the modified plug member 120 will be described by way of an example with reference to FIG. 19 wherein there are shown two parts 124 and 126 connected with each other by a fluid pipe 128. The part 124 may, for example, be a high pressure fuel injection pump of an automotive fuel injection system and the other part 126 may be a fuel injection valve.

Figure 19:
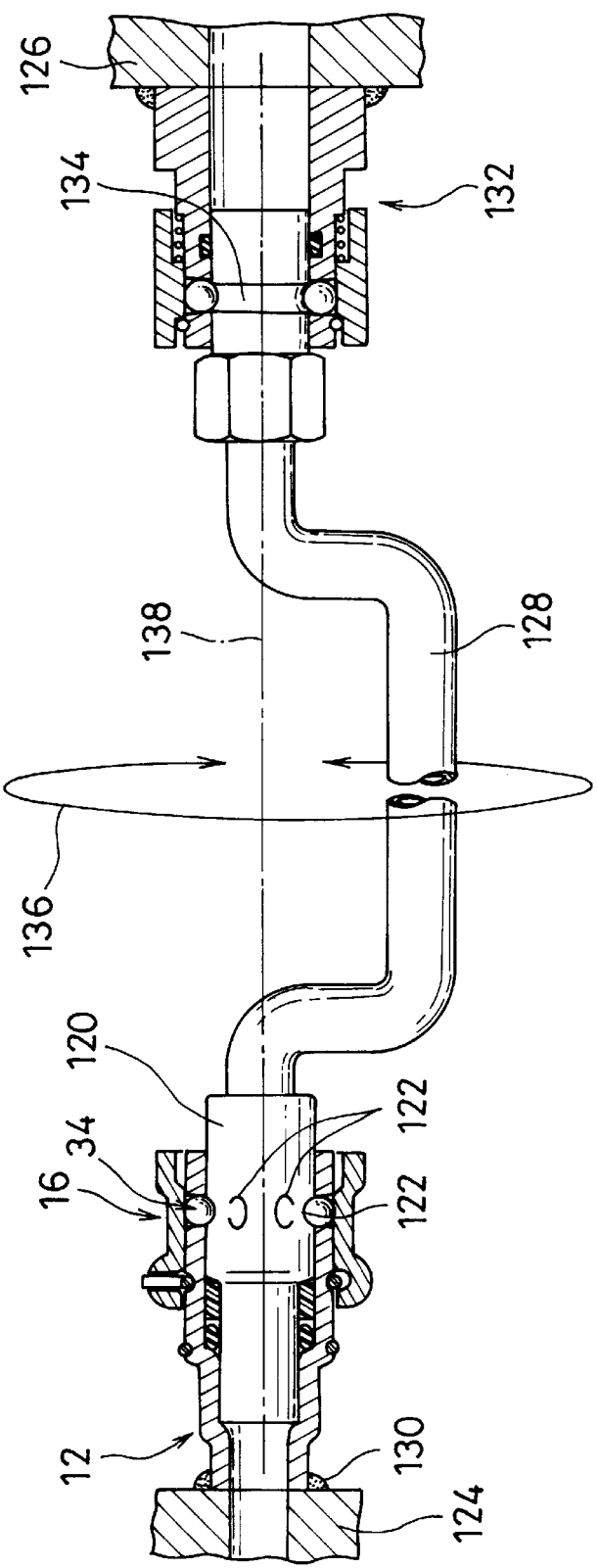
FIG. 19 is a side view, partly cut away, showing a fluid pipe connected at an end to a part of a fluid system by the quick connector of the invention having the modified plug member shown in FIGS. 17 and 18 and at the other end to another part by a conventional quick connector.

In the layout shown in FIG. 19, an end of the fuel pipe 128 is connected to the part 124 by a quick connector according to the invention incorporating the socket member 12 and the modified plug member 120. The outer ends of the socket 12 and the plug 120 may be joined by welding to the part 124 and the pipe 128, respectively, one of the welds being shown at 130. For the purposes of comparison, there is shown in FIG. 19 a conventional quick connector 132 which is used to connect the other end of the pipe 128 to the other part 126, the connector 132 being similar to the one shown in FIGS. 1 and 2 and having a plug member provided with an annular groove 134.

In the application illustrated, the socket member 12 and the plug member 120 as coupled are retained together by the locking balls 34 engaged, respectively, within the discrete recesses 122. In contrast to the annular groove 134 which permits the locking balls to roll therearound in the circumferential direction, the discrete recesses 122 of the plug member 120 precludes the balls 34 to roll and prevents relative rotation between the socket member 12 and the plug member 120. Accordingly, the angular position of the fuel pipe 128 will be kept unchanged even though subjected to a high level of vibration.

If, otherwise, the plug members each having an annular groove as shown at 134 are provided at both ends of the pipe 128, the fuel pipe 128 would be rotated as shown by the arrow 136 about the axis 138 of the connectors in response to engine vibration and would interfere with neighboring engine parts thereby damaging the fuel pipe 128 as well as the engine parts. Therefore, the use of the plug member 120 provided with the discrete recesses 122 for the locking balls is desirable in applications in which the fluid lines are subjected to a high level of vibration.

Referring to FIGS. 20–26, the quick connector according to the second embodiment of the invention will be described. Similar to the first embodiment, the major parts of the quick connector including the socket member, plug member and control sleeve may be made from sheet metal blanks in a similar manner. In FIGS. 20–26, parts and members similar to those of the first embodiment are indicated by like reference numerals with a suffix "A" and will not be described again.

To describe the differences, the socket member 12A of the second embodiment differs from the socket member 12 of the first embodiment in two respects. First, in contrast to the groove 80 of the first embodiment being formed by machining with a machine tool such as a lathe as described before, the stopper ring retaining groove 80A of the second embodiment is formed by stamping the wall of the intermediate product of the socket member in the radially inward direction. The stamping operation may be carried out in one stage of the transfer press in a manner similar to that described before with reference to FIG. 16. Forming of the groove 80A by stamping is advantageous because stamping can be performed in the same transfer press without transferring the products toward a machine tool installed in a separate station.

As a result of stamping, an inwardly directed annular projection 150 will be formed on the inner periphery of the first section 18A of the socket member, as best shown in FIG. 20. The annular projection 150 advantageously serves as a stopper for the backup ring 50A as well as an abutment for the plug member 14A as described later.

Secondly, the socket member 12A is provided with an annular rib or projection 152 having an outer diameter slightly larger than the outer diameter of the first section 18A. The annular rib 152 is formed by turning back or folding the outer periphery of the first shoulder portion 24A radially inwardly. The annular rib 152 may be readily formed by upsetting or swaging the outer periphery of the shoulder portion 24A in one station of the transfer press.

The annular rib 152 functions in the first place as a seat for the stop ring 82A against which the stop ring 82A may rest as it is fitted over the socket member as described later. Accordingly, the annular groove 84 of the first embodiment may be eliminated in the second embodiment. Formation of the annular rib 152 by upsetting, in combination with formation of the groove 80A by stamping as described before, advantageously enable to manufacture the socket member 12A solely by sheet metal working without recourse to machine tool machining.

The annular rib 152 also functions as a positioning means for limiting the movement of the control sleeve 16 during assembly of the connector as described later.

As will be apparent from FIG. 21, the plug member 14A is similar in design to the plug member 14 of the first embodiment and may be made in a similar manner.

Referring to FIG. 22, the control sleeve 16A of the second embodiment is made by combining an outer casing 154 and an inner member 156 both of which are made by deep drawing of sheet metal blanks and which are shaped generally in the form of a stepped tube.

More specifically, the outer casing 154 has a frontal flange 158, a large diameter tubular section 160, an intermediate section 162 of a reduced diameter, a small diameter section 164, and an inturned flange 166. The inner member 156 includes a frontal flange 168, a large diameter first section 170, a second section 172 of a reduced diameter, and a small diameter section 174.

The outer casing 154 and the inner member 156 are firmly joined together to form a unitary structure by press fitting the inner member 156 into the outer casing 154 and by crimping the outer portion 176 of the flange 168 of the inner member 156 over and beyond the outer end of the flange 158 of the outer casing 154. With this arrangement, a control sleeve 16A having a high degree of rigidity is obtained even though the component parts 154 and 156 are made by deep drawing of a light-gauge sheet metal.

Figure 24:
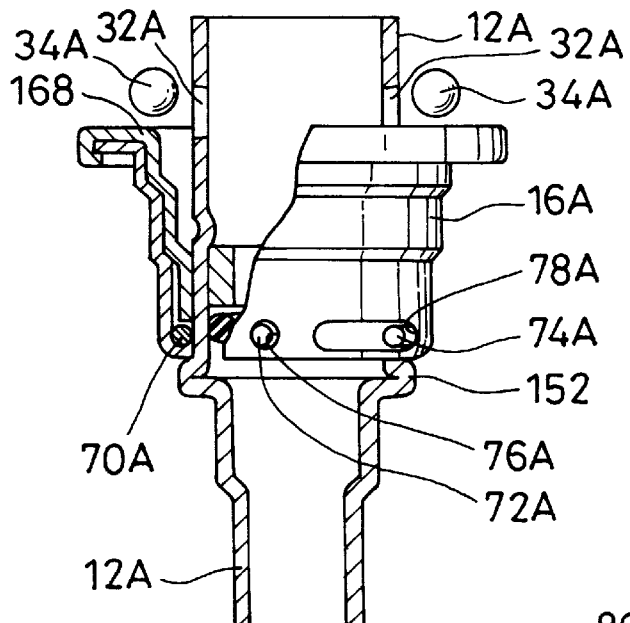
FIG. 24 is a side view, partly cut away, showing the manner in which the locking balls are installed; and, FIGS. 25 and 26 are side views, partly cut away, of the second embodiment showing the control sleeve in its unlocking and locking positions, respectively.
Figure 25:
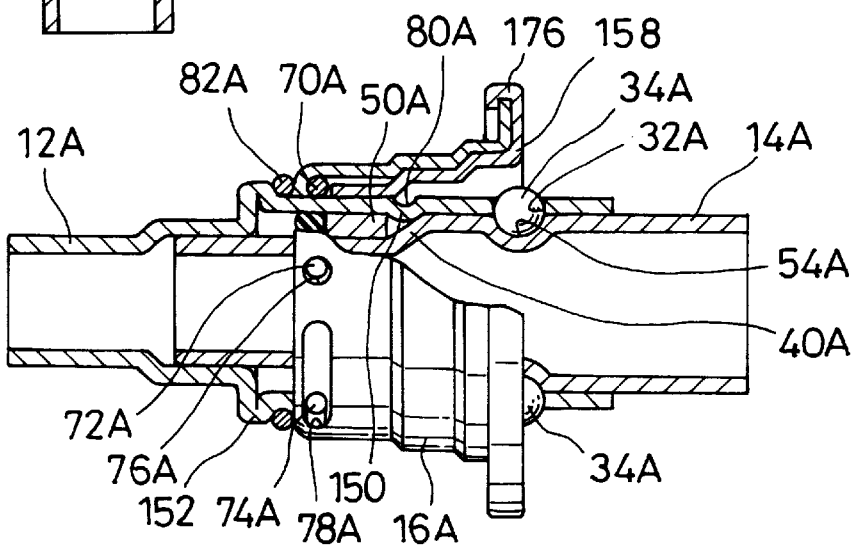
Figure 26:
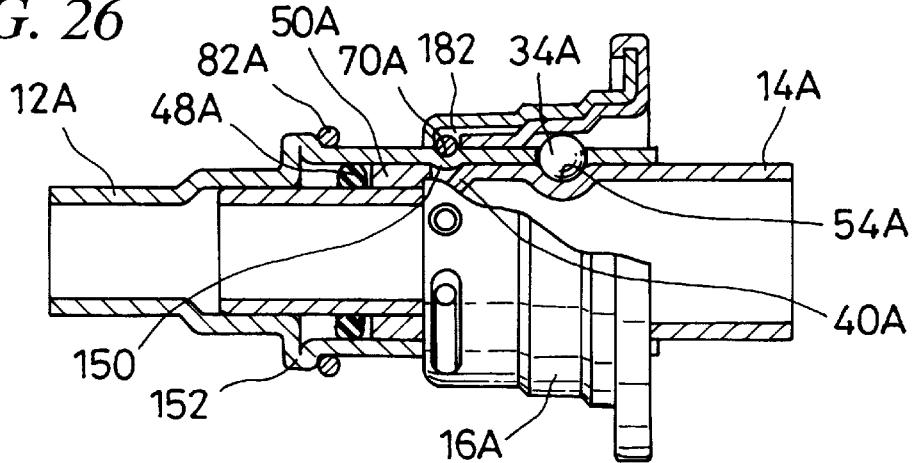

The inner diameter of the third section 174 of the inner member 156 is selected such that the section 174 closely and slidably fits over the socket member 12A as will be apparent from FIGS. 24–26. The shoulder portion 178 located between the first and second sections 170 and 172 of the inner member 156 defines a tapered cam surface for driving by cam action the locking balls 34A radially inwardly toward the annular groove 54A of the plug member 14A.

The inner periphery of the second section 172 of the inner member 156 serves to retain the locking balls 34A in engagement with the groove 54A and, therefore, has such an inner diameter as to confine the locking balls 34A into engagement with the groove 54A in the operative position of the sleeve 16A shown in FIG. 26.

As shown in FIG. 22, the end 180 of the inner member 156 is axially spaced from the inturned flange 166 of the outer casing 154 by an axial distance W. Furthermore, the inturned flange 166 of the outer casing 154 projects radially inwardly from the third section 164 by a radial distance d. As a result, an inwardly open annular space 182 is formed between the outer casing 154 and the inner member 156. This annular space 182 is used to install the stopper ring 70A as shown in FIGS. 24–26. Similar to the first embodiment, the ends of the stopper ring 70A extend through the circular opening 76A and the elongated opening 78 which are formed by punching through the wall of the third section 164.

One of the advantages of the combination sleeve 16A is that a high degree of rigidity to withstand a radial force exerted by the locking balls 34A is achieved. Another advantage is that, as compared with the first embodiment wherein the annular groove 68 of the sleeve is formed by curling as shown at steps (E) and (F) of FIG. 9, it is possible to control the radial depth d and the axial length W of the annular space 182 with a high degree of precision because these parameters are dependent on the precision of trimming of the sheet metal blanks. A further advantage of the combination sleeve 16A is that punching of the outer casing 154 to form the openings 76A and 78A is easy to perform because a split forming die need not be used.

The assembly of the parts of the connector 10A according to the second embodiment may be carried out in the following manner. First, the C-shaped stopper ring 70A is mounted within the annular space 182 of the control sleeve 14A with both ends 72A and 74A engaged respectively within the openings 76A and 78A. Then the socket member 12A is inserted into the sleeve 14A until the inturned flange 166 of the sleeve abuts against the annular rib 152 of the socket member as shown in FIG. 24.

Then the socket member 12A and the sleeve as fitted thereon are held upright as shown in FIG. 24 and the locking balls 34A are installed within the respective pockets 32A. Installation of the balls 34A is possible because, in the absence of the stop ring 82A, the inturned flange 166 of the sleeve is in direct contact with the annular rib 152 of the socket member so that the end face of the flange 168 is downwardly offset from the central plane of the pockets 34A as will be readily understood from FIG. 24. It will be noted that installation of the locking balls 34A can be performed in an easy manner due to the presence of the first section 170 and the flange 168 surrounding the pockets 32A to assist the balls to roll inwardly.

Then the stop ring 82A is mounted over the socket member 12A between the annular rib 152 and the control sleeve 14A as shown in FIG. 25. Due to the presence of the stop ring 82A, the control sleeve 16A is shifted forwardly so that the end face of the flange 168 is now located forwardly of the central plane of the pockets 32A as will be apparent from FIG. 25. Accordingly, once the stop ring 82A is installed, the locking balls 32A will no longer be permitted to slip out of the gap between the socket member and the first section 170.

Subsequent to or prior to mounting of the sleeve, the O-ring 48A and the backup ring 50A are inserted into the first section 18A of the socket. The backup ring 50A is cut along an inclined plane 184 as shown in FIG. 23 to ensure that it is resiliently compressed as shown by the phantom line. Accordingly, the backup ring 50A may readily be inserted into the first section 18A past the annular projection 150. Once the backup ring 50A is positioned between the annular projection 150 and the shoulder 24A of the socket, the annular projection 150 serve to keep the backup ring 50A within the socket.

Coupling and disconnection of the socket and plug members 12A and 14A may be carried out in a manner similar to the first embodiment. The crimped portion 176 of the sleeve 16A having an enlarged diameter will facilitate manipulation of the control sleeve. The plug member 14A may be inserted into the socket member 12A until the shoulder 40A of the plug abuts against the annular projection 150 as shown in FIG. 26. When the plug member 14A is disconnected from the socket member 12A, the annular projection 150 will prevent the backup ring 50A from slipping out of the socket.

While the present invention has been described herein with reference to the specific embodiments thereof, it is contemplated that the invention is not limited thereby and various modifications and alterations may be made therein without departing from the scope of the invention.

What is claimed is:

1. A ball-lock-type quick-acting connector comprising:

a socket member and a plug member adapted to be detachably coupled with each other, locking ball members, a control sleeve slidably fitted over said socket member for controlling the locking ball members to interengage with said socket member and said plug member so as to retain said plug member in said socket, said socket member having a stepped bore therethrough including a first bore and a second bore connected by a shoulder portion, said first bore having an inner diameter larger than an inner diameter of said second bore, said plug member having a stepped cylindrical outer surface including a first outer surface and a second outer surface connected by a shoulder portion, said first and second outer surfaces being so sized in outer diameter as to be closely fitted in a telescoping fashion in said first and second bores, respectively, of said socket member, said shoulder portions of said socket and plug members being axially opposite with each other to define an annular chamber therebetween as said plug member is inserted in said socket member with said first and second outer surfaces of said plug member being fitted, respectively, in said first and second bores of said socket member, said annular chamber being defined in the radial direction between said first bore and said second outer surface, an annular sealing member disposed in said annular chamber to provide a fluid-tight seal between said first bore and said second outer surface as said socket and plug members are coupled with each other, a backup ring disposed in said annular chamber between said sealing member and said shoulder portion of the plug member to back-up the sealing member, said first bore of said socket member being continuously straight, defining a radial surface forming part of said annular chamber for retaining said sealing member and said backup ring, said sealing member and said backup ring being retained in said annular chamber by being axially confined between said shoulder portions of said socket and plug members.

2. The connector as defined in claim 1, wherein said socket and plug members are made primarily by plastic working of a sheet metal.

3. The connector as defined in claim 2, wherein said sleeve comprises an inner tube and an outer tube each made from a sheet metal, said inner and outer tubes being press fitted with each other to form a unitary structure.

4. The connector as defined in claim 1, wherein said backup ring is interference fitted within said first bore of the socket member and wherein said backup ring has an inner diameter larger than the outer diameter of said second outer surface of the plug member to ensure that said backup ring is spaced with a radial clearance from the second outer surface of the plug member.

5. The connector as defined in claim 1, wherein said socket member is provided at the outer circumference thereof with a plurality of discrete hemispherical recesses circumferentially spaced apart from each other for engagement by respective ball members, said ball members when engaged in said recesses preventing said socket member from rotating relative to said plug member.

6. The connector as defined in claim 1, further comprising retaining means for positively retaining said sleeve in the locking position thereof.

7. The connector as defined in claim 6, wherein said retaining means comprises a stop ring received within an inwardly directed annular groove of said sleeve, said stop ring being resiliently fitted around said socket member, said socket member being provided at the outer circumference thereof with an outwardly directed annular groove in which said stop ring can snap-fit when said inwardly directed annular groove of said sleeve is brought into registration with said outwardly directed annular groove of said socket member.

8. The connector as defined in claim 7, wherein said stop ring is generally C-shaped and has a pair of radially outwardly extending ends, one of said ends being anchored to said sleeve, the other end being loosely received within a circumferential slot in the sleeve and extending radially outwardly from said sleeve to permit engagement by a finger.

9. The connector as defined in claim 7, wherein said sleeve comprises an inner tube and an outer tube each made by plastic working of a sheet metal, said inner tube being press fitted within said outer tube to form a unitary structure, said outer tube having an inturned flange at an end thereof, said inturned flange of the outer tube and an associated end of said inner tube being spaced in the axial direction to define therebetween said inwardly directed annular groove for receiving said stop ring.

10. The connector as defined in claim 9, wherein each of said inner and outer tubes has an outwardly turned flange at another end thereof, the outer periphery of said flange of the inner tube being crimped over said flange of the outer tube.

11. The connector as defined in claim 1, further comprising first and second positioning means for limiting the travel of said sleeve with respect to said socket member, said first positioning means being arranged to locate said sleeve at a first position which permits installation of the ball members into pockets formed in said socket member, said second positioning means being detachably mounted over said socket member and arranged to locate said sleeve at a second position in which said ball members are confined by said sleeve in respective pockets.

12. The connector as defined in claim 11, wherein said second positioning means comprises a snap ring detachably mounted over the socket member contiguous to said first positioning means.

13. A ball-lock-type quick-acting connector comprising:

a socket member and a plug member adapted to be detachably coupled with each other, locking ball members, a control sleeve slidably fitted over said socket member for controlling the locking ball members to interengage with said socket member and said plug member so as to retain said plug member in said socket, said socket and plug members being made primarily by plastic working of a sheet metal, said socket member having a stepped bore therethrough including a first bore and a second bore connected by a shoulder portion, said first bore having an inner diameter larger than an inner diameter of said second bore, said plug member having a stepped cylindrical outer surface including a first outer surface and a second outer surface connected by a shoulder portion, said first and second outer surfaces being so dimensioned as to be snugly fitted in a telescoping fashion in aid first and second bores, respectively, of said socket member, said shoulder portions of said socket and plug members being axially opposite with each other to define an annular chamber therebetween as said plug member is inserted in said socket member with said first and second outer surfaces of said plug member being fitted, respectively, in said first and second bores of said socket member, said annular chamber being defined in the radial direction between said first bore and said second outer surface, an annular sealing member disposed in said annular chamber to provide a fluid-tight seal between said first bore and said second outer surface as said socket and plug members are coupled with each other, a backup ring disposed in said annular chamber between said sealing member and said shoulder portion of the plug member to back-up the sealing member, said first bore of said socket member being continuously straight, defining a radial surface forming part of said annular chamber for retaining said sealing member and said backup ring, said sealing member and said backup ring being retained in said annular chamber by being axially confined between said shoulder portions of said socket and plug members.

14. A ball-lock-type quick-acting connector comprising:

a socket member and a plug member adapted to be detachably coupled with each other, locking ball members, a control sleeve slidably fitted over said socket member for controlling the locking ball members to interengage with said socket member and said plug member so as to retain said plug member in said socket, said socket member having a stepped bore therethrough including a first bore and a second bore connected by a shoulder portion, said first bore having an inner diameter larger than an inner diameter of said second bore, said plug member having a stepped cylindrical outer surface including a first outer surface and a second outer surface connected by a shoulder portion, said first and second outer surfaces being so sized in outer diameter as to be closely fitted in a telescoping fashion in said first and second bores, respectively, of said socket member, said shoulder portions of said socket and plug members being axially opposite with each other to define an annular chamber therebetween as said plug member is inserted in said socket member with said first and second outer surfaces of said plug member being fitted, respectively, in said first and second bores of said socket member, said annular chamber being defined in the radial direction between said first bore and said second outer surface, an annular sealing member disposed in said annular chamber to provide a fluid-tight seal between said first bore and said second outer surface as said socket and plug members are coupled with each other, a backup ring disposed in said annular chamber between said sealing member and said shoulder portion of the plug member to back-up the sealing member, and retaining means for positively retaining said sleeve in the locking position thereof.

15. The connector as defined in claim 14, wherein said retaining means comprises a stop ring received within an inwardly directed annular groove of said sleeve, said stop ring being resiliently fitted around said socket member, said socket member being provided at the outer circumference thereof with an outwardly directed annular groove in which said stop ring can snap-fit when said inwardly directed annular groove of said sleeve is brought into registration with said outwardly directed annular groove of said socket member.

16. The connector as defined in claim 15, wherein said stop ring is generally C-shaped and has a pair of radially outwardly extending ends, one of said ends being anchored to said sleeve, the other end being loosely recieved within a circumferential slot in the sleeve and extending radially outwardly from said sleeve to permit engagement by a finger.

17. The connector as defined in claim 15, wherein said outwardly directed annular groove of said socket member is formed by stamping a wall of said socket member radially inwardly in such a manner that an inwardly directed annular projection is formed on the inner periphery of said socket member, said inwardly directed annular projection serving to prevent said backup ring from slipping out of said socket member when said plug member is disconnected from said socket member.

18. The connector as defined in claim 17, wherein, as said plug member is inserted in said socket member, said shoulder portion of said plug member abuts against said inwardly directed annular projection of said socket member to limit the relative position of the socket and plug members.

19. The connector as defined in claim 15, wherein said sleeve comprises an inner tube and an outer tube each made by plastic working of a sheet metal, said inner tube being press fitted within said outer tube to form a unitary structure, said outer tube having an inturned flange at an end thereof, said inturned flange of the outer tube and an associated end of said inner tube being spaced in the axial direction to define therebetween said inwardly directed annular groove for receiving said stop ring.

20. The connector as defined in claim 19, wherein each of said inner and outer tubes has an outwardly turned flange at another end thereof, the outer periphery of said flange of the inner tube being crimped over said flange of the outer tube.

21. A ball-lock-type quick-acting connector comprising:
a socket member and a plug member adapted to be detachably coupled with each other, locking ball members, a control sleeve slidably fitted over said socket member for controlling the locking ball members to interengage with said socket member and said plug member so as to retain said plug member in said socket, said socket member having a stepped bore therethrough including a first bore and a second bore connected by a shoulder portion, said first bore having an inner diameter larger than an inner diameter of said second bore, said plug member having a stepped cylindrical outer surface including a first outer surface and a second outer surface connected by a shoulder portion, said first and second outer surfaces being so sized in outer diameter as to be closely fitted in a telescoping fashion in said first and second bores, respectively, of said socket member, said shoulder portions of said socket and plug members being axially opposite with each other to define an annular chamber therebetween as said plug member is inserted in said socket member with said first and second outer surfaces of said plug member being fitted, respectively, in said first and second bores of said socket member, said annular chamber being defined in the radial direction between said first bore and said second outer surface, an annular sealing member disposed in said annular chamber to provide a fluid-tight seal between said first bore and said second outer surface as said socket and plug members are coupled with each other, a backup ring disposed in said annular chamber between said sealing member and said shoulder portion of the plug member to back-up the sealing member, and first and second positioning means for limiting the travel of said sleeve with respect to said socket member, said first positioning means being arranged to locate said sleeve at a first position which permits installation of the ball members into pockets formed in said socket member, said second positioning means being detachably mounted over said socket member and arranged to locate said sleeve at a second position in which said ball members are confined by said sleeve in respective pockets.

22. The connector as defined in claim 21, wherein said second positioning means comprises a snap ring detachably mounted over the socket member contiguous to said first positioning means.

23. A ball-lock-type quick-acting connector comprising:
a socket member and a plug member adapted to be detachably coupled with each other, locking ball members, a control sleeve slidably fitted over said socket member for controlling the locking ball members to interengage with said socket member and said plug member so as to retain said plug member in said socket, said socket member having a stepped bore therethrough including a first bore and a second bore connected by a shoulder portion, said first bore having an inner diameter larger than an inner diameter of said second bore, said plug member having a stepped cylindrical outer surface including a first outer surface and a second outer surface connected by a shoulder portion, said first and second outer surfaces being so sized in outer diameter as to be closely fitted in a telescoping fashion in said first and second bores, respectively, of said socket member, said shoulder portions of said socket and plug members being axially opposite with each other to define an annular chamber therebetween as said plug member is inserted in said socket member with said first and second outer surfaces of said plug member being fitted, respectively, in said first and second bores of said socket member, said annular chamber being defined in the radial direction between said first bore and said second outer surface, an annular sealing member disposed in said annular chamber to provide a fluid-tight seal between said first bore and said second outer surface as said socket and plug members are coupled with each other, a backup ring disposed in said annular chamber between said sealing member and said shoulder portion of the plug member to back-up the sealing member, said socket and plug members being made primarily by plastic working of a sheet metal, and said sleeve comprises an inner tube and an outer tube each made from a sheet metal, said inner and outer tubes being press fitted with each other to form a unitary structure.

24. A ball-lock-type quick-acting connector comprising:

a socket member and a plug member adapted to be detachably coupled with each other, locking ball members, a control sleeve slidably fitted over said socket member for controlling the locking ball members to interengage with said socket member and said plug member so as to retain said plug member in said socket, said socket member having a stepped bore therethrough including a first bore and a second bore connected by a shoulder portion, said first bore having an inner diameter larger than an inner diameter of said second bore, said plug member having a stepped cylindrical outer surface including a first outer surface and a second outer surface connected by a shoulder portion, said first and second outer surfaces being so sized in outer diameter as to be closely fitted in a telescoping fashion in said first and second bores, respectively, of said socket member, said shoulder portions of said socket and plug members being axially opposite with each other to define an annular chamber therebetween as said plug member is inserted in said socket member with said first and second outer surfaces of said plug member being fitted, respectively, in said first and second bores of said socket member, said annular chamber being defined in the radial direction between said first bore and said second outer surface, an annular sealing member disposed in said annular chamber to provide a fluid-tight seal between said first bore and said second outer surface as said socket and plug members are coupled with each other, a backup ring disposed in said annular chamber between said sealing member and said shoulder portion of the plug member to back-up the sealing member, said first bore of said socket member being provided with an inwardly directed annular projection projecting radially inwardly from said first bore to prevent said backup ring from slipping out of said first bore when said plug member is disconnected from said socket member.

* * * * *